(12) United States Patent
Reiter et al.

(10) Patent No.: US 7,648,673 B2
(45) Date of Patent: Jan. 19, 2010

(54) PROCESS FOR DENOXIFICATION OF OFF-GASES FROM ANNEALING AND PICKLING LINES, AND AN ANNEALING AND PICKLING LINE, ESPECIALLY FOR STAINLESS STEEL HOT OR COLD STRIP

(75) Inventors: Ferdinand Reiter, Vienna (AT); Peter Van Gilst, Spijkenisse (NL); Rodney Verkaart, Rotterdam (NL)

(73) Assignee: Andritz AG, Graz (AT)

( * ) Notice: Subject to any disclaimer, the term of this patent is extended or adjusted under 35 U.S.C. 154(b) by 332 days.

(21) Appl. No.: 11/710,760

(22) Filed: Feb. 26, 2007

(65) Prior Publication Data
US 2007/0205542 A1  Sep. 6, 2007

(30) Foreign Application Priority Data
Feb. 27, 2006  (AT) .............................. A 323/2006

(51) Int. Cl.
*C21C 5/48* (2006.01)
(52) U.S. Cl. ...................................... 266/144; 266/157
(58) Field of Classification Search ................. 266/144, 266/156, 157
See application file for complete search history.

(56) References Cited
FOREIGN PATENT DOCUMENTS
JP          50131803 A  * 10/1975
* cited by examiner

*Primary Examiner*—Scott Kastler
(74) *Attorney, Agent, or Firm*—Alix, Yale & Ristas, LLP

(57) ABSTRACT

A process for denoxification of off-gases from annealing and pickling lines, providing for the off-gases from the pickling section to be heated and denoxified by selective catalytic reduction (SCR). In order to secure the meeting of lowest NOx values in the off-gas with the lowest possible expenditure, heat is supplied from the off-gases from the annealing furnace (1) to the off-gases from the pickling section (3) before the selective catalytic reduction (9).

17 Claims, 1 Drawing Sheet

PROCESS FOR DENOXIFICATION OF OFF-GASES FROM ANNEALING AND PICKLING LINES, AND AN ANNEALING AND PICKLING LINE, ESPECIALLY FOR STAINLESS STEEL HOT OR COLD STRIP

BACKGROUND

The invention concerns a process for denoxification of off-gases from annealing and pickling lines, wherein the off-gases from the pickling section are heated and denoxified by selective catalytic reduction (SCR), and an annealing and pickling line, especially for stainless steel hot or cold strip, comprising at least one annealing furnace and at least one pickling section, as well as a plant for selective catalytic reduction which is connected to the off-gas system of at least one pickling section.

Conventional combustion plants have used selective catalytic reduction (SCR) technology to denoxify fumes for quite some time. In this process, nitrogen oxides (NOx) are converted to nitrogen and water with the help of a catalyst. This technology is also used in the treatment of NOx-containing off-gases in the chemical processing of metals, especially in pickling processes.

SCR catalysts typically require operating temperatures between 250° C. and 300° C. to develop sufficient activity. The lowest operating temperature would be around 200° C., the limiting factor being the formation of ammonium nitrate. As the off-gases from the pickling lines are discharged at approximately 40° C., heating these off-gases to the temperatures required for SCR calls for high expenditure.

Metal processing lines separated from the pickling section often have annealing furnaces equipped with low-NOx burners. The NOx content to be guaranteed for the furnace off-gases, 200 to 240 mg/Nm3, is difficult to meet with some operating modes, so that additional expenditure is required if the guaranteed values are to be met safely.

SUMMARY

An object of the present invention is to provide a process that would ensure meeting the NOx value in the off-gas with the lowest possible expenditure. A further object is to provide an annealing and pickling line for achieving this goal.

The first object is achieved by supplying heat from the off-gases from the annealing furnace to the off-gases from the pickling section before selective catalytic reduction. This means that the heat content in the annealing furnace off-gases is not lost but can be used for heating the pickling line off-gases for the purpose of SCR treatment instead of external energy input, which reduces the overall energy requirement drastically.

In accordance with a first advantageous process embodiment, the pickling section off-gases are merged with those from the annealing furnace and subjected to selective catalytic reduction jointly. By such a measure, the NOx concentration is already drastically reduced before SCR treatment, which influences the catalytic power positively. Furthermore, the furnace can be optimally operated according to the production requirements because slight increases of the NOx content of its off-gases can be cushioned by the SCR treatment.

Advantageously, the off-gases from the pickling section are supplied with heat from the previously merged off-gas stream from the pickling section and the annealing furnace, before they are merged with the off-gas from the annealing furnace. As the quantity of the off-gas from the annealing furnace is much higher than the amount of off-gas from the pickling section, very good heat transfer, and thus, increase of the total efficiency, can be achieved.

In a particularly advantageous embodiment, the off-gases from the pickling section are supplied with heat from the previously merged and SCR-treated off-gas stream before being merged with the off-gas from the annealing furnace.

A further embodiment provides for the pickling section to be supplied with additional heat from external sources, which would compensate for any furnace operating conditions with discharge of insufficiently hot off-gases or insufficient off-gas quantities. Thus, the process according to the invention could also be used for ferritic materials and stainless steel hot strip.

Preferably, the off-gases in the pickling section are heated by the merged off-gases to between 140° C. and 280° C.

According to a further feature, the merged off-gases are heated to between 200° C. and 360° C. before selective catalytic reduction.

In accordance with a first system embodiment, the annealing and pickling line are characterized by merging the off-gas system of the annealing furnace and the off-gas system of the at least one pickling section before the selective catalytic reduction plant. As mentioned with respect to the process embodiment, this system facilitates running the furnace optimally according to the production requirements, and the NOx concentration of the off-gases intended for SCR treatment can also be drastically reduced even before treatment, which influences the catalytic power positively.

In order to utilize the heat contained especially in the furnace off-gases, a heat exchanger, preferably a recuperator, is used advantageously before the merging of the off-gas systems of the annealing furnace and the at least one pickling section and before the selective catalytic reduction plant.

If, according to an advantageous embodiment of the plant, the connection of the heat exchanger for the low-temperature medium is joined with the off-gas system of the at least one pickling section, external energy supply can be avoided on account of the heating of the off-gases from the pickling section, which is necessary for the SCR technology, being achieved by means of the off-gases from the furnace.

On account of the relative ratios between the large quantity of off-gas with a high temperature and the low quantity of off-gases with low temperature, particularly good heat transfer can be achieved if the connection of the heat exchanger for the high-temperature medium is connected to the merging of the off-gas systems of the annealing furnace and the at least one pickling section. In this case, the off-gas that is further to be fed to the SCR treatment is not cooled to below the SCR plant operating temperature.

In order to be able to compensate any sudden temperature decreases due to failure, planned standstill (for instance, in the case of stainless steel hot strip), and too low off-gas quantities from the furnace, a burner, preferably a low-NOx burner, is installed between the exit for the low-temperature medium from the heat exchanger and the plant for selective catalytic reduction, according to a further embodiment.

The heat exchanger is advantageously designed as a counter-current heat exchanger.

BRIEF DESCRIPTION OF THE DRAWINGS

The following description serves to explain the invention in greater detail and according to the attached drawings, where.

DETAILED DESCRIPTION

Figure 1:
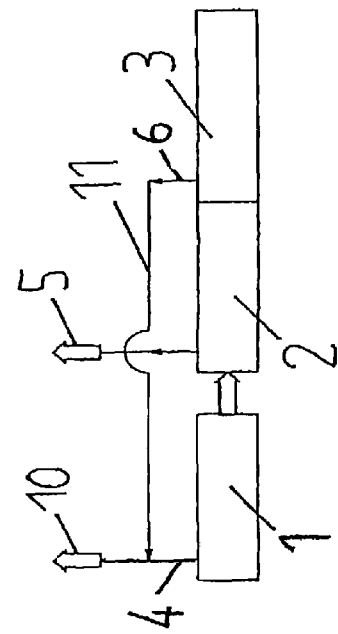
FIG. 1 shows a schematic representation of a conventional annealing and pickling line.

The portion of a production line schematically represented in FIG. 1 comprises an annealing section 1 and a pickling line, consisting of a pre-pickle 2 and a mixed acid pickling section 3. The annealing section 1 may be avoided in the event of stainless steel hot strip processing, or it can at least be kept very small. The off-gases from the annealing furnace in annealing section 1 are discharged through exhaust 4 without being treated, especially if the annealing furnace, as it is common today, is equipped with low-NOx burners. The off-gases from the pre-pickle 2 and a mixed acid pickling section 3 are also discharged through separate exhausts 5, 6.

Figure 2:
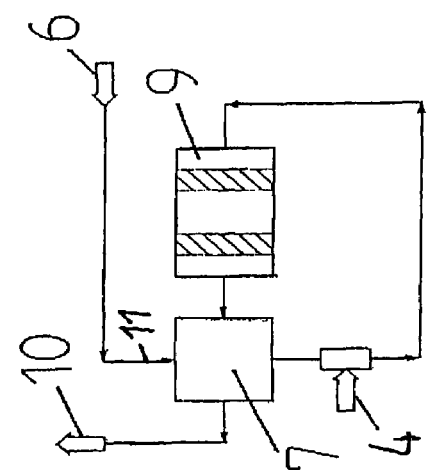
FIG. 2 is a schematic representation of a conventional SCR treatment for the off-gases from the pickling section of the line in FIG. 1.
Figure 4:
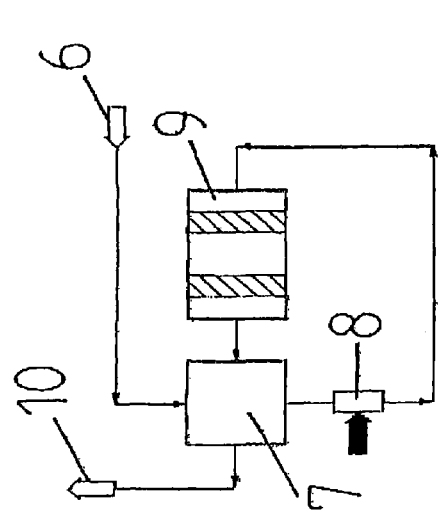
FIG. 4 shows the design of the SCR treatment for the off-gas from the line shown in FIG. 3.

Normally, the exhaust 6 from the mixed-acid pickling section 3 is connected to an SCR plant as schematically represented in FIG. 2. The off-gases from pickling section 3, coming from exhaust 6, are normally passed through a heat exchanger, preferably a counter-current heat exchanger, in order to pre-heat the off-gases from the pickling section from typically approx. 40° C. A burner 8 is arranged after the heat exchanger 7, preferably again being a low-NOx burner, which heats the off-gas quantity of 3,000 to 20,000 Nm3/h from the pickling section to the operating temperature for the SCR reactor 9, typically to at least 200° C., but preferably to 250° C. to 300° C. The treated off-gases are then passed through heat exchanger 7 in order to preheat the off-gases from pickling section 3 therein. Finally, the off-gases are discharged to the atmosphere through a chimney 10.

Figure 3:
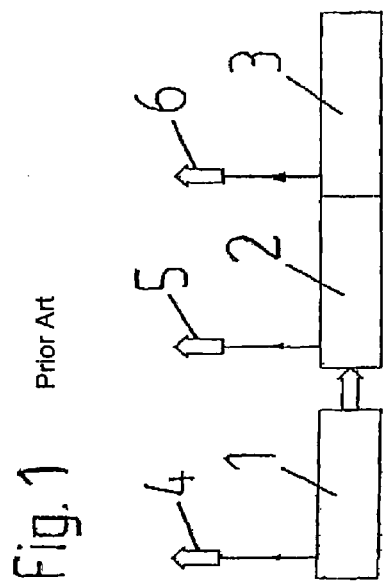
FIG. 3 is a schematic representation of an annealing and pickling line in the configuration according to an embodiment of the invention.

By contrast, and as shown in FIG. 3, the new solution in accordance with the present disclosure provides for the off-gases from mixed-acid pickling section 3 not to be handled separately but to be merged with the off-gases from annealing section 1 as symbolised by the connection line 11 and to be further treated jointly. By merging the 3,000 to 20,000 Nm3/h of off-gases from the pickling section with a high NOx content and the 10,000 to 80,000 Nm3/h off-gases from the annealing section 1 with a far lower content of nitrogen oxides, the NOx concentration decreases drastically even before the SCR treatment.

Advantageously, this is achieved by leading the off-gases from the mixed acid pickling section 3 after exhaust 6 again through heat exchanger 7 in order to heat them. Preferably, the off-gas from the mixed pickling section leaves this section through an exhaust 6, then the off-gases are led through a heat exchanger 7 via line 11. Heated to between approx. 140° C. and 280° C. on leaving heat exchanger 7, the off-gases are then merged with the off-gases from the annealing furnace in annealing section 1, which have a temperature ranging between 250 and 400° C., so that the off-gas mixture, on entering the SCR reactor 9, has a temperature ranging from 200° C. to 360° C. depending on the relative off-gas quantities and their temperatures. Thus, the SCR reaction can take place at optimum temperature and optimum efficiency. The temperature of the off-gases after SCR treatment, which is still very high, is then used to transfer their heat to the off-gases from pickling section 3 and to pre-heat these off-gases by passing these off-gases from SCR treatment through heat exchanger 7 and only then discharging them into the atmosphere. This is done with especially good effect on account of the quantity of pickling off-gases being by far exceeded by the quantity of mixed-off-gas at high temperature, meaning that the energy of the off-gases is utilized optimally. In the end, the off-gas that is discharged through the chimney 10 to the atmosphere is optimally denoxified gas.

If the furnace operating conditions do not result in the discharge of sufficiently hot off-gases or too low off-gas quantities, an additional burner, preferably surely also a low-NOx burner, may be arranged between heat exchanger 7 and the SCR reactor 9 instead of or additionally to the infeed of off-gas from the annealing section 1.

The invention claimed is:

1. In a process for denoxification of off-gases from annealing and pickling lines having a respective annealing furnace and pickling section, wherein the off-gases from the pickling section are heated and denoxified by selective catalytic reduction (SCR), the improvement comprising:
   heating the off-gases from the pickling station in a heat exchanger;
   merging the heated off-gases from the pickling station with the off-gases from the annealing furnace whereby heat from the off-gases from the annealing furnace is supplied to the off-gases from the pickling section;
   subjecting the merged off-gas stream to selective catalytic reaction; and
   supplying heat from the merged off-gas stream to the off-gasses from the pickling station in the heat exchanger, before the off-gases from the pickling station are merged with the off-gas from the annealing furnace.

2. Process according to claim 1, wherein the off-gases from the pickling section are supplied with heat from the previously merged and with selective catalytic reduction treated off-gas stream before being merged with the off-gas from the annealing furnace.

3. Process according claim 1, wherein the off-gases from the pickling section are supplied with additional heat from external sources.

4. Process according to claim 1, wherein the off-gases from the pickling section are heated to between 140° C. and 280° C.

5. Process according to claim 1, wherein the merged off-gases are heated to between 200° C. and 360° C. before selective catalytic reduction.

6. Process according to claim 1, wherein the off-gases from the pickling section are supplied with additional heat from external sources.

7. Process according to claim 1, wherein the off-gases from the pickling section are heated to between 140° C. and 280° C.

8. Process according claim 1, wherein the off-gases from the pickling section are supplied with additional heat from external sources.

9. In a plant having a metal annealing and pickling line, including at least one annealing furnace and at least one pickling section which produce respective off-gases which are discharged through an annealing furnace off-gas flow path and a pickling section off-gas flow path, respectively, and a catalytic reduction device which receives the off-gas of at least one pickling section, the improvement in said line which comprises:
   a heat exchanger disposed in the pickling section off-gas flow path; and
   a merged off-gas flow path disposed downstream of the heat exchanger, the merged off-gas flow path being in communication with the pickling section off-gas flow path and the annealing furnace off-gas flow path;
   wherein the selective catalytic reduction device and the heat exchanger are disposed in the merged off-gas flow path, the heat exchanger being downstream of the selective catalytic reduction device.

10. The annealing and pickling line according to claim 9, wherein the heat exchanger for the low-temperature medium is connected to the off-gas system of the at least one pickling section.

11. The annealing and pickling line according to claim 10, wherein the connection of the heat exchanger for the high-temperature medium is joined with the merging of the off-gas systems of the furnace and the at least one pickling section.

12. The annealing and pickling line according to claim 9, wherein a burner is installed between the exit for the low-temperature medium from the heat exchanger and the selective catalytic reduction plant.

13. The annealing and pickling line according to claim 9, wherein the heat exchanger is a counter-current heat exchanger.

14. The annealing and pickling line according to claim 10, wherein a burner is installed between the exit for the low-temperature medium from the heat exchanger and the selective catalytic reduction plant.

15. The annealing and pickling line according to claim 10, wherein the heat exchanger is a counter-current heat exchanger.

16. The annealing and pickling line according to claim 11, wherein a burner is installed between the exit for the low-temperature medium from the heat exchanger and the selective catalytic reduction plant.

17. The annealing and pickling line according to claim 11, wherein the heat exchanger is a counter-current heat exchanger.

* * * * *